US012240015B2

(12) United States Patent
Dal Ben

(10) Patent No.: US 12,240,015 B2
(45) Date of Patent: Mar. 4, 2025

(54) SCREENING MACHINE FOR SCREENING SOLID MATERIAL

(71) Applicant: PAL S.R.L., Ponte di Piave (IT)

(72) Inventor: Antonio Dal Ben, Ponte di Piave (IT)

(73) Assignee: PAL S.R.L., Ponte di Piave (IT)

( * ) Notice: Subject to any disclaimer, the term of this patent is extended or adjusted under 35 U.S.C. 154(b) by 0 days.

(21) Appl. No.: 18/567,911

(22) PCT Filed: Jun. 7, 2022

(86) PCT No.: PCT/IT2022/050164
§ 371 (c)(1),
(2) Date: Dec. 7, 2023

(87) PCT Pub. No.: WO2022/259281
PCT Pub. Date: Dec. 15, 2022

(65) Prior Publication Data

US 2024/0261820 A1 Aug. 8, 2024

(30) Foreign Application Priority Data

Jun. 8, 2021 (IT) ........................ 102021000014957

(51) Int. Cl.
*B07B 13/14* (2006.01)

(52) U.S. Cl.
CPC .......... *B07B 13/14* (2013.01); *B07B 2201/04* (2013.01); *B07B 2220/00* (2013.01)

(58) Field of Classification Search
CPC .... A62C 2/00; A62C 4/00; A62C 4/04; B07B 2200/00; B07B 2201/04; B07B 13/14
USPC .......................................................... 209/3.1
See application file for complete search history.

(56) References Cited

FOREIGN PATENT DOCUMENTS

| | | | | | |
|---|---|---|---|---|---|
| CN | 1557572 | A | | 12/2004 | |
| DE | 102018115221 | A1 | * | 1/2020 | |
| IT | 202100014939 | A1 | * | 6/2021 | |
| IT | 202100014957 | A1 | * | 6/2021 | |
| UA | 106800 | C2 | * | 6/2011 | |
| WO | WO-2020174100 | A1 | * | 9/2020 | ............. B07B 1/284 |
| WO | WO-2022259281 | A1 | * | 12/2022 | ............... A62C 3/06 |

OTHER PUBLICATIONS

International Search Report and Written Opinion for corresponding International PCT Application No. PCT/IT2022/050164, dated Oct. 11, 2022.

* cited by examiner

*Primary Examiner* — Terrell H Matthews
(74) *Attorney, Agent, or Firm* — K&L Gates LLP

(57) ABSTRACT

Screening machine (10) for screening solid materials, comprising both a screening box (12) shaped so as to have a plurality of perimeter walls (16, 17, 19, 21) and an upper wall (15), and configured to make said solid materials to be screened flow inside it, and also a plurality of anti-propagation devices (27), at least a first of which is disposed on said upper wall (15).

11 Claims, 3 Drawing Sheets

SCREENING MACHINE FOR SCREENING SOLID MATERIAL

CROSS-REFERENCE TO RELATED APPLICATIONS

This application is a U.S. National Stage Entry under 35 U.S.C. § 371 of International Patent Application No. PCT/IT2022/050164, entitled SCREENING MACHINE FOR SCREENING SOLID MATERIALS, filed Jun. 7, 2022, which claims benefit of Italian Patent Application No. 102021000014957, filed Jun. 8, 2021, the entire disclosures of which are hereby incorporated by reference herein.

FIELD OF THE INVENTION

The present invention concerns a screening machine for screening solid materials, in particular of the type which could give rise to potentially explosive dust, such as for example small wood shavings, but is not limited to this.

BACKGROUND OF THE INVENTION

It is known that screening machines are normally provided with a screening box divided into compartments inside which screening surfaces are positioned on which the material to be sieved or screened is made to flow.

Furthermore, the screening box normally has a certain downward inclination from an inlet zone to an outlet zone and has a length of up to about 7-8 meters or more.

The materials treated by screening machines can be of various types and some of them, such as wood shavings, give rise to dust which, when mixed with air, can become explosive. In particular, this phenomenon can develop with greater probability when the wood shavings come from a dryer disposed upstream of the screening machine and are very small, for example less than 6 mm, to be subsequently treated to make panels. In fact, in these shavings, there is normally a significant amount of wood dust (up to 15%) with sizes of less than 0.5 mm which, in a stoichiometric ratio with the air inside the compartments of the screening machine, can become explosive.

The screening machine, especially of the oscillating type, has to therefore be adequately protected with suitable devices in order to prevent the propagation of possible explosions that can occur inside it, for example in one of the two compartments, upper and lower, through which the material passes.

In order to protect the machine from explosions, there are currently two types of protection devices: active and passive.

Passive protection devices comprise anti-propagation membranes or valves communicating with the inside of the screening box in order to propagate the pressure wave generated by the explosion in appropriate directions toward the outside of the box.

Some types of these passive protection devices are also equipped with a box-like member associated with the membrane and provided with at least one flame arrestor grate to arrest the flames caused by the explosion that are propagated outside the machine.

Currently, passive protection devices are attached only to an upper wall of the screening box.

This installation configuration, however, does not allow the devices as above to adequately protect both the upper and lower compartments of the screening box, at least in some situations of use.

In fact, if the explosion is triggered inside the lower compartment, it is not always able to reach the devices disposed on the upper wall in order to propagate outside.

In fact, the presence of the screening surfaces and possible intermediate loading and unloading hoppers between the upper and lower compartments acts as a barrier, limiting the expansion of the explosion which therefore, remaining confined inside the screening box, can cause serious damage.

There is therefore a need to perfect a screening machine for screening solid materials which can overcome at least one of the disadvantages of the state of the art.

In particular, one purpose of the present invention is to provide such a screening machine in which the explosions that can occur both in the upper compartment, but especially in the lower compartment, can propagate toward the outside without causing damage to the structure of the machine.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purpose, and in order to resolve the technical problem in a new and original way, also achieving considerable advantages with respect to the prior state of the art, a screening machine for screening solid materials according to the present invention comprises:

- a screening box shaped so as to have a plurality of perimeter walls and an upper wall,
- a plurality of screening surfaces disposed inside the screening box in order to make the solid materials to be screened flow, and
- a plurality of anti-propagation devices, at least a first of which is disposed on the upper wall.

In accordance with one aspect of the present invention, at least a second of the anti-propagation devices is associated with at least one of the perimeter walls by means of a respective connection device that has both a function of decoupling with the inside of the screening box and also a function of seal between two or more screening surfaces.

Advantageously, the connection device guarantees the seal between different screening surfaces in order to prevent contamination of the smaller fractions of solid materials by those with larger sizes.

Furthermore, the connection device is able to guarantee the exposure of the sensitive parts of the anti-propagation device—for example a membrane, a shutter or similar elements—with respect to the inside of the screening box, without giving sealing functions to said sensitive parts, therefore without directly applying, for example, compressed gaskets.

In accordance with another aspect of the present invention, the at least a second of the anti-propagation devices, positioned on at least one lateral wall of the perimeter walls, is disposed near a rear wall of the perimeter walls.

In accordance with another aspect of the present invention, the anti-propagation devices are disposed in a symmetrical manner with respect to a vertical plane of symmetry that is equidistant from the lateral walls.

In accordance with another aspect of the present invention, the anti-propagation devices installed laterally and/or at the front, possibly also at the rear, are associated with a respective connection device attached to the screening box in correspondence with a respective through aperture.

In accordance with another aspect of the present invention, each connection device comprises a frame able to be attached to one of the perimeter walls, and a containing box attached to the frame on the opposite side with respect to that of attachment on the screening box and, during use, associated with the respective anti-propagation device.

In accordance with another aspect of the present invention, the frame is provided with a plurality of apertures substantially having a height coordinated with a vertical distance of separation between the screening surfaces. Furthermore, inside the containing case there are a plurality of plates projecting from the frame in correspondence with a lower edge of a respective one of the apertures.

In accordance with another aspect of the present invention, each anti-propagation device comprises a membrane, or a valve, provided with a shutter, and the plates extend from the frame toward the anti-propagation device ending at a certain distance from the membrane and/or from the shutter without contacting them. In this way, it is possible to prevent an accidental activation of the anti-propagation device.

In accordance with another aspect of the present invention, each of the plates ends flush with the lower edge of the respective aperture, the lower edge being aligned on the other side with the respective screening surface. The plates therefore configure a localized lateral extension of the screening surfaces, directed toward the outside of the screening box.

In accordance with another aspect of the present invention, the frame has a coupling surface configured to go into contact with one of the perimeter walls and with the screening surfaces. Furthermore, there are sealing means on the lateral edges of the coupling surface and around the apertures and/or along the lateral edge of the screening surfaces affected. Advantageously, the presence of the sealing means, and the configuration of the connection device prevent giving the sensitive parts of the anti-propagation device any sealing function whatsoever.

In accordance with another aspect of the present invention, the plates have a terminal border conformed as a vertical barrier at least along the side opposite the frame and, during use, facing the anti-propagation device. Furthermore, the plates have an inclination toward the screening surface with which they cooperate, in order to facilitate the flow of the material toward the screening surfaces. In this way, it is possible to prevent contamination of the solid materials between different screening surfaces, at least during normal operation of the screening machine, and also in the case of activation of the anti-propagation devices.

DESCRIPTION OF THE DRAWINGS

These and other aspects, characteristics and advantages of the present invention will become apparent from the following description of some embodiments, given as a non-restrictive example with reference to the attached drawings wherein.

Figures 1, 2, 3:
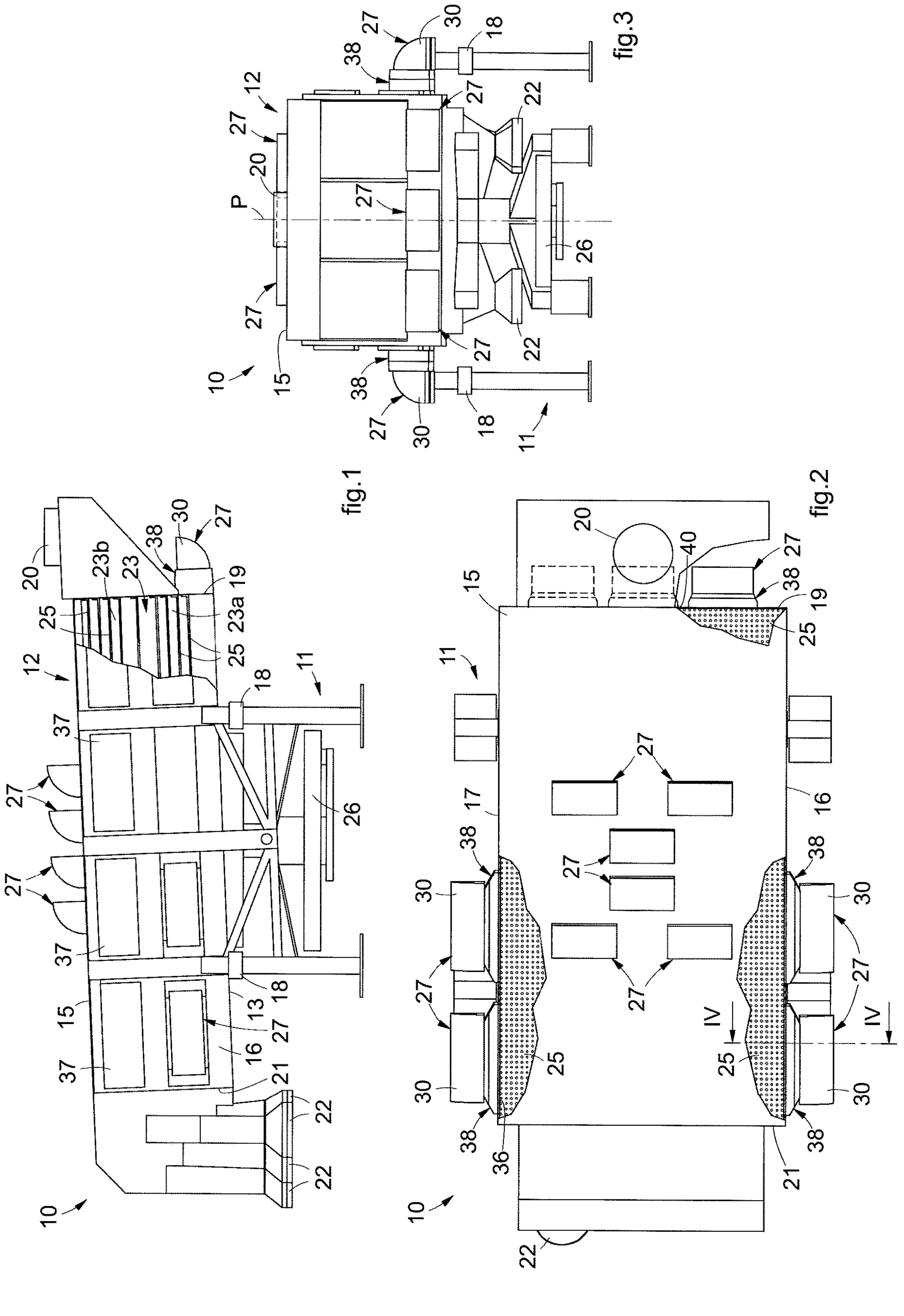
FIG. 1 is a lateral view of a screening machine for screening solid materials according to the present invention.
FIG. 2 is a top view of FIG. 1.
FIG. 3 is a front view of FIG. 1.

We must clarify that in the present description the phraseology and terminology used, such as for example the terms horizontal, vertical, front, rear, upper, lower, internal and external, with their declinations, have the sole function of better illustrating the present invention with reference to the attached drawings and must not be in any way used to limit the scope of the invention itself, or the field of protection defined by the attached claims.

Before describing an embodiment of the present invention, we must also clarify that this must not be considered as limited in its application to the details of the construction and disposition of the components as described in the present description using the attached drawings. In fact, the present invention can take on other embodiments and can be obtained or executed in various other equivalent ways.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIGS. 1, 2 and 3, a screening machine 10 according to the present invention for screening solid materials, in particular of the type which could give rise to potentially explosive dusts, such as for example small wood shavings, although it is not limited to this, comprises a support structure 11 on which there is mounted a screening box 12 which is configured to make the solid materials to be screened flow inside it.

The screening box 12 substantially has the shape of a parallelepiped with a rectangular base and comprises a bottom wall 13, an upper wall 15 and four perimeter walls, in particular two lateral walls 16 and 17, a front wall 19, which is associated with an inlet compartment 20, or hopper, for the entry of the materials to be screened, and a rear wall 21 associated with a series of outlet ducts 22, used for the collection of the screened materials, possibly divided according to granulometry.

In the screening box 12 there are some compartments 23, divided into at least a lower compartment 23*a* and an upper compartment 23*b*, in which screening surfaces 25 are disposed, on which the solid materials to be screened can flow.

The screening box 12 has an inclination of a few degrees, for example from 1° to 45° with respect to a horizontal plane, so that the screening surfaces 25 are higher in the part that is close to the inlet compartment 20 in order to promote the displacement of the materials to be screened toward the outlet ducts 22.

The screening box 12 is mounted on the support structure 11 by means of elastic joints 18 so that it can oscillate.

On the support structure 11 there is installed a movement device 26 of a type known per se, which is connected to the screening box 12 in such a way as to give the latter an oscillatory movement such as to make the solid materials flow from the inlet compartment 20 to the outlet ducts 22.

The upper wall 15 is provided with a plurality of through apertures, for example six, for the closure of each there being installed, externally, a corresponding anti-propagation device 27 of a type known per se, or one that will be developed in the future.

By anti-propagation device 27 in the present description we mean a device capable of venting toward the outside the pressure wave caused by an explosion that occurs inside the screening box 12, and possibly also of preventing the flame caused by the explosion from developing toward the outside, damaging objects or people.

According to the present invention, each anti-propagation device 27, or at least one of them, is advantageously of the passive type, that is, capable of absorbing, immediately upon generation, a possible explosion that were to occur in the screening box 12, for example caused by a sudden ignition caused by the self-combustion of the solid materials to be screened, and to convey the resulting pressure wave toward the outside, instead of positively using chemical suppressors, possibly activated by sensors, designed to remove oxygen from the reaction that causes the explosion.

Figure 4:
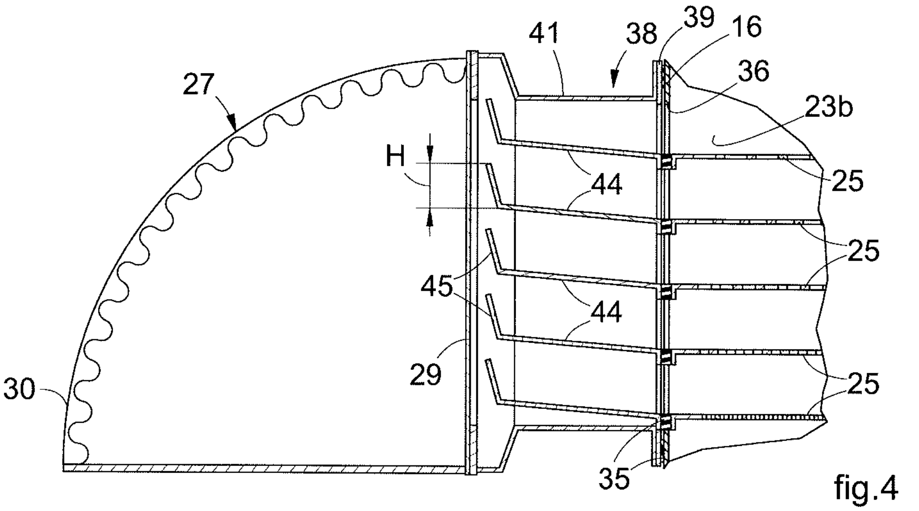
FIG. 4 is a section view along the line IV-IV of FIG. 2.
Figure 5:
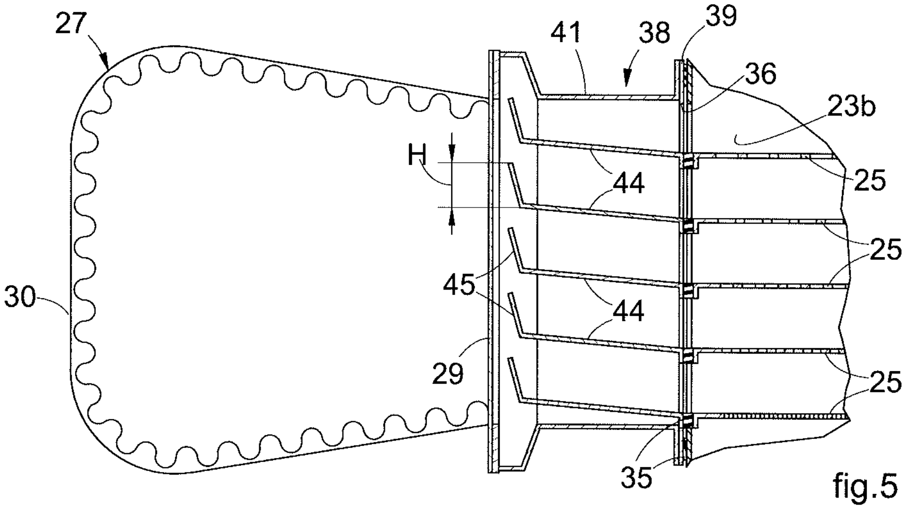
FIGS. 5 and 6 are variants of FIG. 4.

Some embodiments of the present invention provide that each anti-propagation device 27 comprises a membrane 29 (FIGS. 4 and 5) capable of opening on three sides since it is, for example, hinged on a fourth side, when it is hit from the inside of the screening box 12 with an overpressure, even a very low one, starting from about 0.1 bar. Furthermore, especially in the event the screening machine 10 is installed, or can be installed, in closed spaces, each anti-propagation device 27 can also comprise a box-shaped member 30 associated with the membrane 29 and provided with at least one flame arrestor grate 31 of a type known per se.

Figure 6:
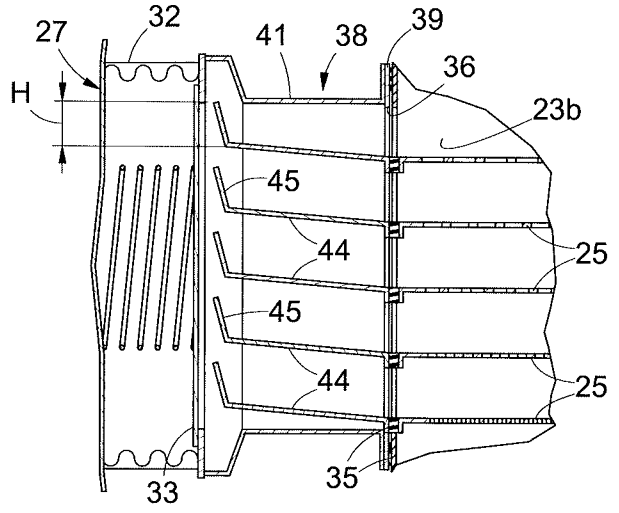

Some embodiments of the present invention alternatively provide that each anti-propagation device 27 comprises a valve 32 (FIG. 6) of a type known to the people of skill in the art as an "EVN valve", which essentially consists of a shutter 33 conditioned by a spring toward a closing position and which can be driven automatically in the event of an explosion inside the screening box 12.

On each lateral wall 16 and 17, in correspondence with both the lower compartment 23*a* and also the upper compartment 23*b*, some through apertures 36 are present (FIGS. 4-6), thanks to which it is possible to access the inside of the compartments 23*a* and 23*b* themselves, for any need whatsoever, for example for checks or maintenance.

With each of the apertures 36 there can be associated a closing door 37 that can be selectively opened toward the outside.

In accordance with one aspect of the present invention, an anti-propagation device 27 is installed externally on at least one of the apertures 36, instead of the corresponding closing door 37.

Some embodiments of the present invention provide that two anti-propagation devices 27 are disposed on each of the two lateral walls 16 and 17, preferably in correspondence with the lower compartment 23*b* and near the rear wall 21.

Preferably, in order to balance the mobile mass of the screening box 12 and of the anti-propagation devices 27 installed thereon, the latter are disposed symmetrically with respect to a vertical plane of symmetry P (FIG. 3) which is equidistant from the two lateral walls 16 and 17.

Other embodiments of the present invention provide that, in addition or alternatively, one or more anti-propagation devices 27 are disposed on the front wall 19, preferably in correspondence with the lower compartment 23*b* (FIG. 3), after having made corresponding through apertures 40 in the front wall 19, or using possible through apertures 40 already present therein.

It is clear that a person of skill in the art will be able to decide, as a function of the particular operating requirements of the screening machine 10, to dispose even only one, or more than two, anti-propagation devices 27 for each lateral wall 16 and 17 and/or front wall 19.

Possible embodiments of the present invention provide that, in addition or alternatively, one or more anti-propagation devices 27 are disposed on the rear wall 21, preferably in correspondence with the lower compartment 23*b*.

Furthermore, in order to prevent each membrane 29 and/or shutter 33 from being inadvertently damaged, or activated by the screening surfaces 25 or by possible sealing gaskets associated therewith, the anti-propagation devices 27 installed laterally and/or at the front, possibly also at the rear, are associated with a respective connection device 38 that is attached to the screening box 12 in correspondence with through apertures 36, 40.

Each connection device 38 is configured to guarantee a seal between the anti-propagation device 27 and the screening surfaces 25, preventing direct contact between the latter and the membrane 29 and/or shutter 33 of the anti-propagation device 27 itself. Furthermore, the connection device 38 allows to guarantee the seal between different screening surfaces 25, in order to prevent the contamination of the smaller fractions of solid materials by the larger ones.

With particular reference to FIGS. from 4 to 8, each connection device 38 comprises a frame 39 able to be attached to one of the perimeter walls, for example lateral 16, 17, front 19 or rear 21, of the screening box 12, and a containing box 41 attached to the frame 39, on the opposite side with respect to that of attachment on the screening box 12, and associated during use with the anti-propagation device 27.

The containing box 41 is open at least in the direction of the frame 39 and in the opposite direction, that is, during use, in the direction of the through aperture 36 and of the membrane 29 and/or of the shutter 33 of the anti-propagation device 27, so as to allow the communication between the latter and the compartments 23.

The connection device 38 advantageously guarantees the exposure of the sensitive parts of the anti-propagation device 27, in this specific case the membrane 29 and/or the shutter 33, to the compartment 23 to be protected without giving them a sealing function, therefore without directly applying compressed gaskets thereto, as occurs in the state of the art.

The connection of the containing box 41 with the anti-propagation device 27 can occur by means of attachment means of a known type, for example screws, bolts, flanges, gaskets, and in any case in such a way as to convey all, or almost all, of the pressure wave on the membrane 29 and/or on the shutter 33.

The frame 39 is provided with a plurality of apertures 42 substantially having a height coordinated with the vertical distance of separation between the screening surfaces 25 which are at the desired installation height of the anti-propagation device 27.

Figure 4A:
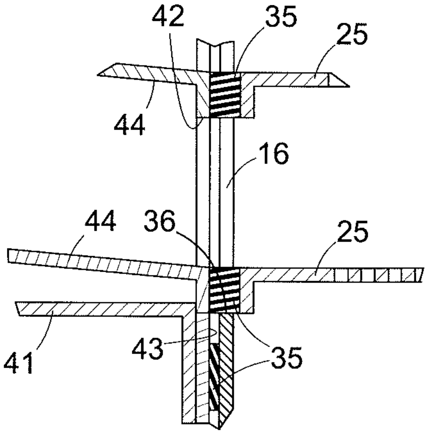
FIG. 4*a* is an enlarged detail of FIG. 4.
Figure 7:
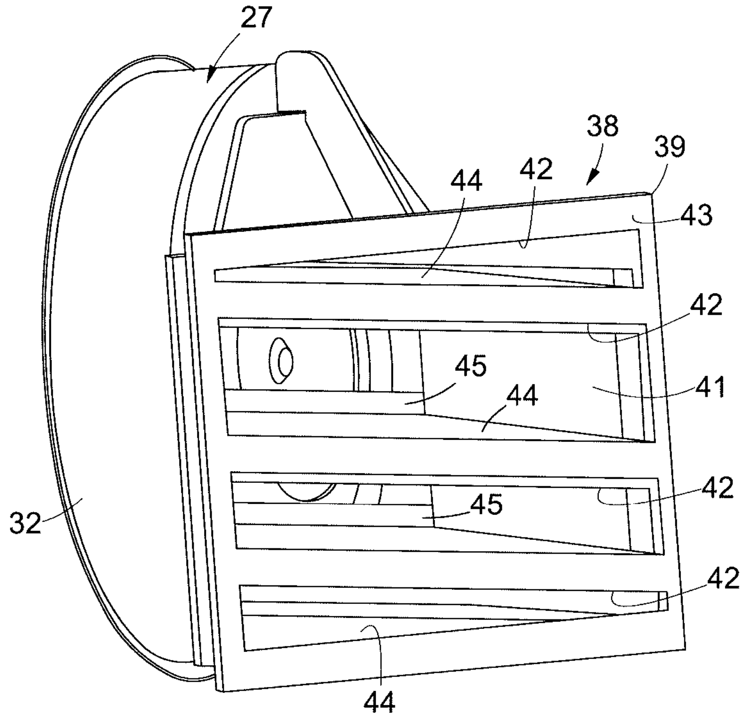
FIGS. 7 and 8 respectively show a perspective view (FIG. 7) and a partly sectioned perspective view (FIG. 8) of an anti-propagation device associated with a connection device.
Figure 8:
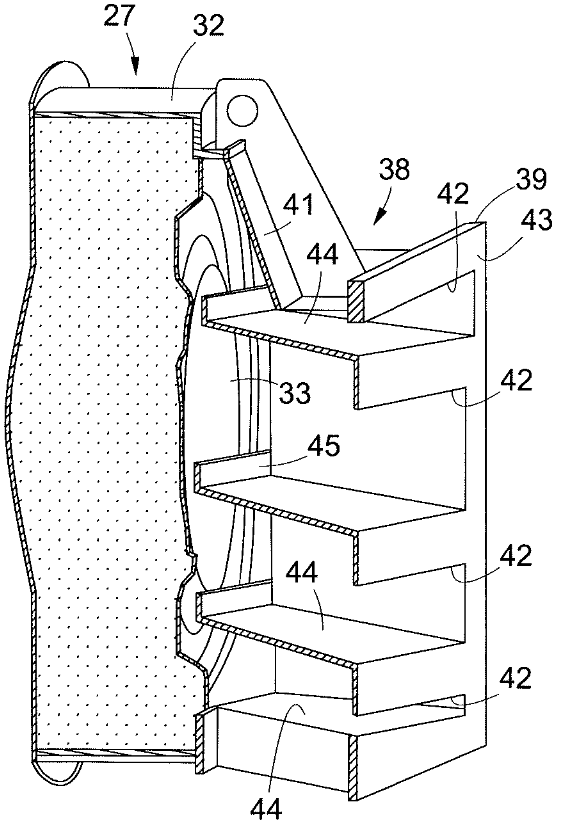

The frame 39 has a coupling surface 43 (FIGS. 4*a*, 7 and 8) able to go into contact with the wall of the screening box 12 and with the screening surfaces 25.

On the lateral edges of the coupling surface 43 and around the apertures 42 and/or along the lateral edge of the screening surfaces 25 there are sealing means 35, for example gaskets.

Advantageously, the seal therefore occurs between connection device 38 and containing case 31 and screening surfaces 25, preventing a direct contact with the membrane 29 and/or with the shutter 33, which could inadvertently activate the anti-propagation device 27.

The connection device 38 comprises a plurality of plates 44 disposed inside the containing box 41 and projecting from the frame 39, in this particular case in correspondence with a lower edge of a respective one of the apertures 42. Advantageously, the plates 44 are laterally delimited by the walls that constitute the containing box 41.

The plates 44 extend from the frame 39 toward the anti-propagation device 27, ending at a certain distance from the membrane 29 and/or from the shutter 33, preferably without contacting them.

Each plate 44 ends flush with the lower edge of the respective aperture 42, said lower edge being aligned on the other side with the respective screening surface 25.

The plates 44 configure a localized lateral extension of the screening surfaces 25.

The plates 44 are advantageously solid and can be made with a press-folded sheet metal.

Advantageously, the plates 44 are inclined toward the screening surface 25 with which they cooperate. In particular, the plates 44 are inclined by a few degrees, for example between 1° and 45° with respect to a horizontal plane, so that the plates 44 are lower in the part close to the frame 39 in order to promote the flow of the materials toward the screening surfaces 25 themselves.

The plates 44 have an additional slope in the direction of inclination of the screening box 12, so as to follow the inclination of the respective screening surface 25.

The plates 44 have a terminal border 45 conformed as a vertical barrier at least along the side opposite the frame 39 and, during use, facing the anti-propagation device 27.

Advantageously, the terminal border 45 prevents, at least during the operation of the screening machine 10, the material present on the screening surfaces 25 from going back up, due to the oscillating movement, along the plates 44, but not to the point of going past it.

The terminal border 45 can have a height H comprised between about 1 cm and about 10 cm, preferably between about 2 cm and about 6 cm.

It is clear that modifications and/or additions of parts may be made to the screening machine 10 as described heretofore, without departing from the field and scope of the present invention as defined by the claims.

In the following claims, the sole purpose of the references in brackets is to facilitate reading and they must not be considered as restrictive factors with regard to the field of protection claimed in the specific claims.

The invention claimed is:

1. Screening machine (10) for screening solid materials, comprising:

a screening box (12) shaped so as to have a plurality of perimeter walls (16, 17, 19, 21) and an upper wall (15), a plurality of screening surfaces (25) disposed inside said screening box (12) in order to make said solid materials to be screened flow, a plurality of passive type explosion anti-propagation devices (27), at least a first of which is disposed on said upper wall (15), wherein at least a second of said passive type anti-propagation devices (27) is associated with at least one of said perimeter walls (16, 17, 19, 21) by means of a connection device (38) that has both a function of decoupling with the inside of said screening box (12) and also a function of seal between two or more screening surfaces (25), wherein the anti-propagation devices (27) installed laterally, at a front, and/or at a rear, are associated with said respective connection device (38) in correspondence with a respective through aperture (36, 40), wherein each connection device (38) comprises a frame (39), able to be attached to one of said perimeter walls (16, 17, 19, 21), and a containing box (41) attached to said frame (39), on the opposite side with respect to that of attachment on said screening box (12), and associated during use with the respective anti-propagation device (27), and wherein said frame (39) is provided with a plurality of apertures (42) substantially having a height coordinated with a vertical distance of separation between said screening surfaces (25), and wherein inside said containing box (41) there are a plurality of plates (44) projecting from said frame (39) in correspondence with a lower edge of a respective one of said apertures (42).

2. Screening machine (10) as in claim 1, wherein said at least a second of said anti-propagation devices (27), positioned on at least one lateral wall (16, 17) of said perimeter walls (16, 17, 19, 21), is disposed near a rear wall (21) of said perimeter walls (16, 17, 19, 21).

3. Screening machine (10) as in claim 2, wherein said anti-propagation devices (27) are disposed in a symmetrical manner with respect to a vertical plane of symmetry (P) equidistant from said lateral walls (16, 17).

4. Screening machine (10) as in claim 1, wherein each anti-propagation device (27) comprises a membrane (29) or a valve (32) provided with a shutter (33), wherein said plates (44) extend from said frame (39) toward said anti-propagation device (27) ending at a certain distance from said membrane (29) and/or from said shutter (33), without contacting them.

5. Screening machine (10) as in claim 1, wherein each of said plates (44) ends flush with the lower edge of the respective aperture (42), said lower edge being aligned on the other side with the respective screening surface (25).

6. Screening machine (10) as in claim 1, wherein said frame (39) has a coupling surface (43) configured to go into contact with one of said perimeter walls (16, 17, 19, 21) and with said screening surfaces (25), wherein there are sealing means (35) on lateral edges of said coupling surface (43) and around said apertures (42) and/or along the lateral edge of said screening surfaces (25) affected.

7. Screening machine (10) as in claim 4, wherein said plates (44) have a terminal border (45) conformed as a vertical barrier at least along the side opposite said frame (39) and, during use, facing said anti-propagation device (27), and wherein said plates (44) are inclined toward the screening surface (25) with which they cooperate.

8. Screening machine (10) as in claim 4, wherein each of said plates (44) ends flush with the lower edge of the respective aperture (42), said lower edge being aligned on the other side with the respective screening surface (25).

9. Screening machine (10) as in claim 4, wherein said frame (39) has a coupling surface (43) configured to go into contact with one of said perimeter walls (16, 17, 19, 21) and with said screening surfaces (25), wherein there are sealing means (35) on lateral edges of said coupling surface (43) and around said apertures (42) and/or along the lateral edge of said screening surfaces (25) affected.

10. Screening machine (10) as in claim 5, wherein said frame (39) has a coupling surface (43) configured to go into contact with one of said perimeter walls (16, 17, 19, 21) and with said screening surfaces (25), wherein there are sealing means (35) on lateral edges of said coupling surface (43) and around said apertures (42) and/or along the lateral edge of said screening surfaces (25) affected.

11. Screening machine (10) as in claim 5, wherein said plates (44) have a terminal border (45) conformed as a vertical barrier at least along the side opposite said frame (39) and, during use, facing said anti-propagation device (27), wherein said plates (44) are inclined toward the screening surface (25) with which they cooperate.

* * * * *